May 16, 1950 G. M. HOLLEY, JR 2,508,260
FUEL FEED CONTROL FOR GAS TURBINES
Filed Dec. 31, 1946 4 Sheets-Sheet 1

George M. Holley Jr.
INVENTOR.
BY
ATTORNEY

May 16, 1950  G. M. HOLLEY, JR  2,508,260
FUEL FEED CONTROL FOR GAS TURBINES
Filed Dec. 31, 1946  4 Sheets-Sheet 3

George M. Holley Jr.
INVENTOR.
BY
ATTORNEY

May 16, 1950     G. M. HOLLEY, JR     2,508,260
FUEL FEED CONTROL FOR GAS TURBINES
Filed Dec. 31, 1946     4 Sheets-Sheet 4
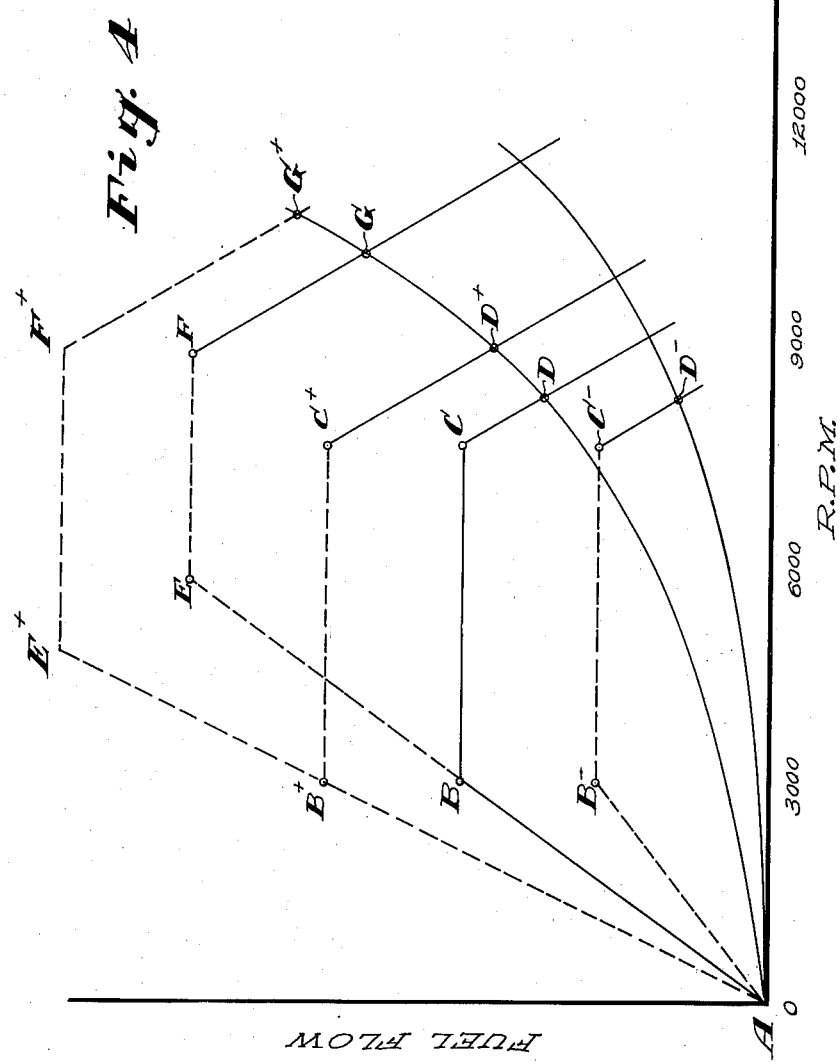

Patented May 16, 1950

2,508,260

UNITED STATES PATENT OFFICE 2,508,260

FUEL FEED CONTROL FOR GAS TURBINES

George M. Holley, Jr., Grosse Pointe, Mich., assignor to George M. Holley and Earl Holley Application December 31, 1946, Serial No. 719,564

3 Claims. (Cl. 60—44)

The object of this invention is to control the fuel flow to an external combustion power plant of the gas turbine type.

Fig. 4 shows the relationship between fuel flow and R. P. M. as influenced by this fuel control and by altitude.

Figure 1:
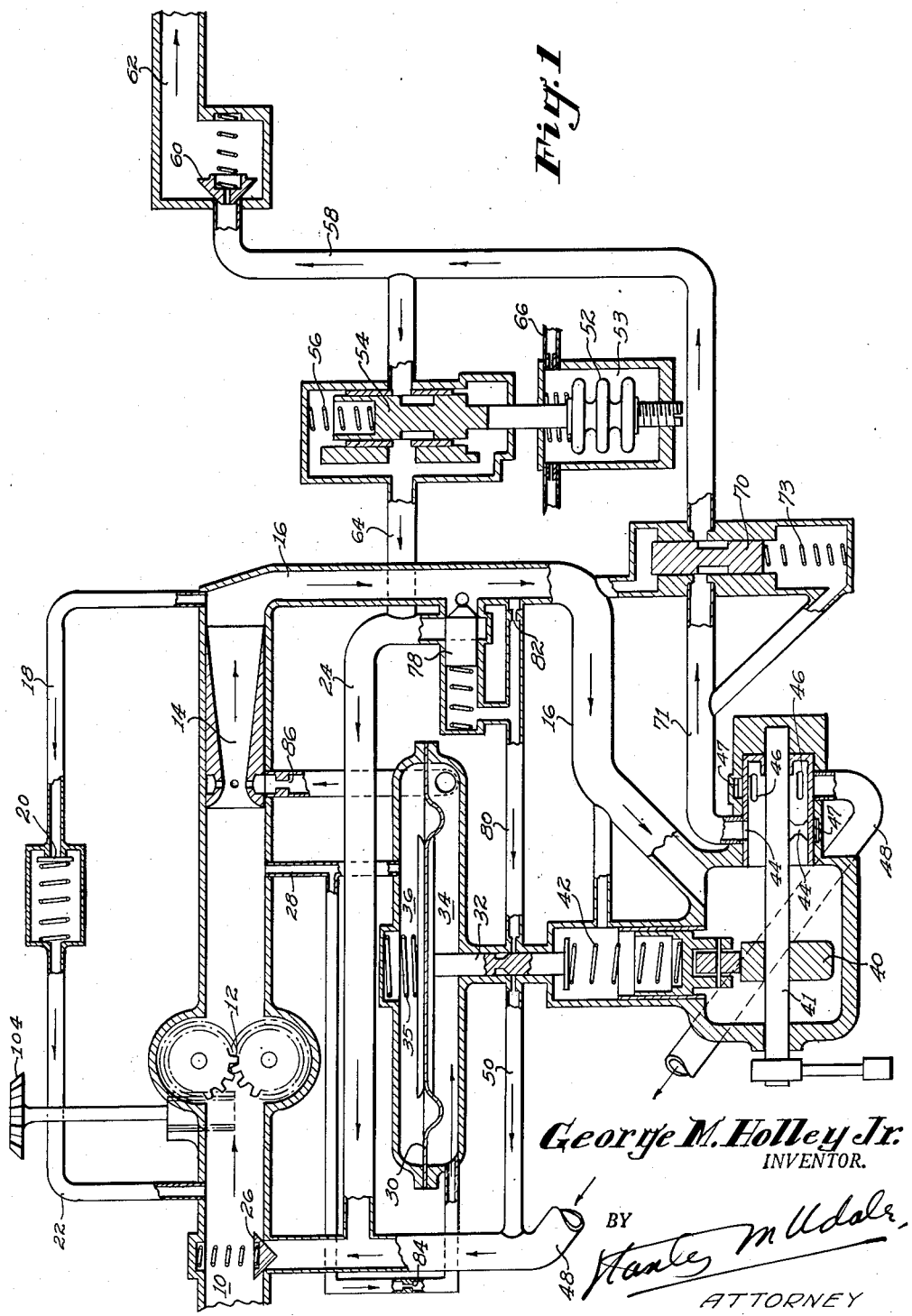
Fig. 1 shows diagrammatically the essential elements of my invention.

In Fig. 1 10 is the fuel entrance leading to a pump 12 driven by a worm which is driven by the gear 104 which is driven by the turbine at a speed proportional to the speed of the turbine compressor 100 and 114. (See Fig. 2.)

Pump 12 may be any pump which has a constant displacement per revolution, actually a gear pump is shown for the purpose of illustration.

14 is a fuel venturi through which substantially all of fuel pumped by the pump 12 passes.

16 is a main fuel outlet. 18 is a return bypass past a spring loaded check valve 20 set to release pressure exceeding 500 pounds per square inch. The flow through 18 returns to the fuel entrance 10 through the passage 22.

24 is the main return passage through which the excess fuel is returned to the fuel entrance 10 past the spring loaded relief valve 26.

30 is a diaphragm which responds to the drop in pressure in the venturi 14. 28 is the passage connecting the chamber 36, above the diaphragm 30, to the outlet from the pump 12 upstream from the venturi 14.

34 is the chamber below the diaphragm 30 connected to the throat of the venturi 14 through the restricted passage 86. 84 is a restricted passage leading to the chamber 34 from the passage 28. 35 is a spring loading the upper surface of the diaphragm 30.

32 is a manually and automatically operated pilot valve which controls the flow through the restricted passage 82 and along the passage 80, past the pilot valve 32, along the passage 50, to the passage 48, past the check valve 26 to the fuel entrance 10. The pressure in 80, lowered by the downward movement of the valve 32, opens the valve 78.

A manually operated shaft 41 controls the four control elements:

(a) Cam 40;
(b) Spring 42 which controls the pilot valve 32;
(c) Metering orifice 44 which controls the flow to the pipe 71; and,
(d) Dump opening 46 to return the fuel to the fuel return pipe 48.

The valve 70 maintains a pressure drop of approximately 110 pounds per square inch across the two sides of the manually operated metering orifice 44. The inside of the manually operated metering orifice 44 and the upper side of the valve 70 is subjected to the pressure in the passage 16. The lower side of the valve 70 is subjected to the pressure in the passage 71 downstream from the orifice 44. Spring 73 plus the pressure in passage 71 equals the pressure in the passage 16. Hence, spring 73 is adjusted to maintain a constant pressure difference of approximately 110 pounds per square inch causing flow through the variable opening 44. (See Fig. 3.)

Figure 2:
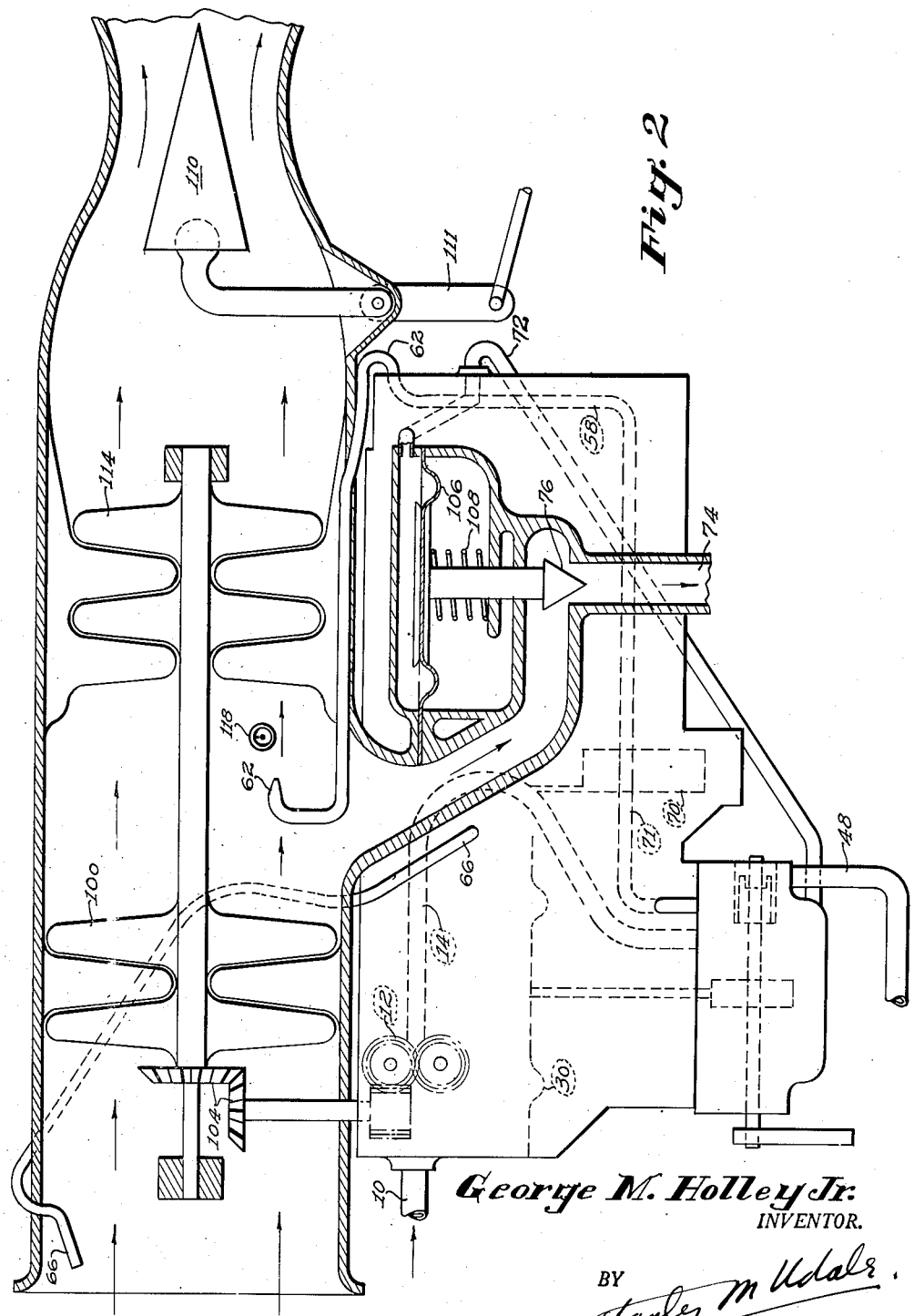
Fig. 2 shows the application of my control to a conventional gas turbine.

After passing valve 70 the fuel flows to the gas turbine combustion chamber through pipe 58, past the spring loaded valve 60 to the pipe 62 which leads to the burners located in the combustion chamber (see Fig. 2).

A pipe 66 leads to the entrance of the compressor and is subjected to the impact pressure due to velocity of flight. (See Fig. 2.)

Bellows 52 lift the valve 54 at high altitudes. Valve 54, when raised against the spring 56, allows some more fuel to escape from the pipe 58, through the passage 64, to the fuel return passage 24.

Valve 54 is a balanced valve and is pushed down by spring 56 against the evacuated element 52 contained in chamber 53 which is subjected to the pressure from the pipe 66. The valve 54 thus furnishes compensation for altitude. (See Fig. 2).

In Fig. 2 the application of this invention to a conventional gas turbine unit is shown.

The compressor 100 drives the gear 12 by a pair of bevel gears 104. The tube 66 indicates the means for obtaining the pressure in the air entrance to the compressor 100 and applying this pressure to the chamber 53 surrounding the bellows 52. Spark plug 118 is located so as to ignite the fuel issuing from the pipe 62.

When the pressure in the pipe 16 falls below 50 pounds per square inch pipe 72 permits the diaphragm 106 to rise under the influence of spring 108 and to open the valve 76 and permit fuel, which drains out of the combustion chamber, to escape through the escape pipe 74. This is for safety reasons only.

The burnt fuel/air mixture flows out behind the power plant, past the conical valve 110, controlled in various positions by a manually operated lever 111.

114 indicates the gas turbine which drives the compressor 100.

Figure 3:
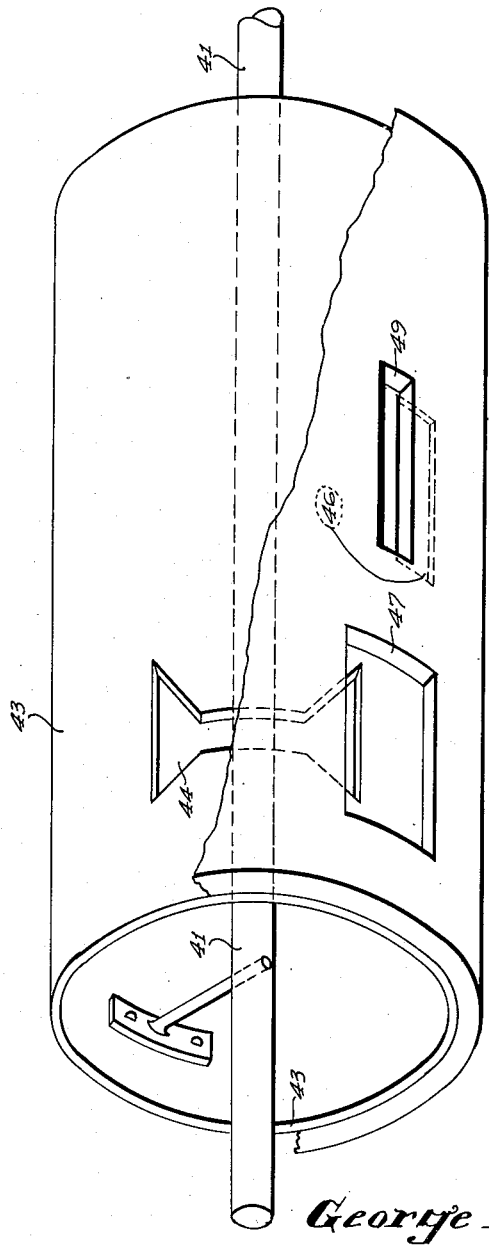
Fig. 3 shows the detail of the manually controlled valve.

Fig. 3 shows the shape of the openings 44 and 46 in the manually controlled fuel valve 43. Two openings 44, in the inner sleeve, when rotated so as to cut off the fuel flow from 16 to 71, puts the two stationary ports 49 into alignment with the two rotating ports 46 in the valve 43 and this relieves the fuel pressure entirely.

When the manual control is moved the other way the port 44 gradually becomes exposed to the stationary port 47 so that an increase in the quantity of fuel is admitted after the flow through the ports 49 from the ports 46 ceases.

The ports 46 and 49 are narrow and a movement of 5° cuts off the flow of fuel through ports 46 and 49.

Altitude control

At altitude the pipe 66 imparts a low pressure to the chamber 53 surrounding the evacuated element 52.

The balanced valve 54 is pushed up and the spring 56 is compressed. The valve 54 permits fuel flowing along the passage 58 to escape along the escape path 64, to the pipe 24, back to the fuel entrance 10, past the spring loaded valve 26. (See Fig. 1.)

Operation

In Fig. 4 the vertical lines represent fuel flow, the horizontal lines R. P. M. and the theory of operation is illustrated.

The line A B+ shows the fuel discharge at any R. P. M., and the horizontal line E+ F+ represents the flow set by the valve 44 and the constant pressure difference is regulated by the constant pressure valve 70.

The horizontal lines are obtained because there is a constant pressure valve 70. Hence, the flow through the valve 44 reaches a ceiling and remains constant until the governor acts.

When the critical speed is reached the pilot valve 32 opens or permits the valve 78 to open and the fuel escaping through valve 78 causes the line F+ G+, which crosses the curved line A D D+ G G+ which limits the speed of the turbine. As the valve 54 is always partly open the actual line at sea level is A B E F G. At G this curved line is the line of turbine requirements at sea level.

Actually the leak through valve 54 causes the line to shift from A B+ to A B E, at sea level and at altitude the line shifts to A B— C— D—.

Hence A E F G represents (at sea level) the result of one position of valve 44 at which the turbine develops considerable power. Hence, A B C D represents (at sea level) a restricted position of valve 44 at which the turbine develops moderate power.

A B— C— D— represents (at altitude) a restricted position of the valve 44 at which the turbine develops moderate power. The curved line A D— represents the turbine requirements at altitude.

The area A E F G A represents fuel available for acceleration at sea level when the turbine is developing considerable power.

The area A B— C— D— represents fuel available for acceleration at altitude when the turbine is developing a moderate amount of power.

What I claim is:

1. A fuel feed device and speed governor therefor, a prime mover of the type in which fuel flow determines the speed of the prime mover, comprising a source of liquid fuel, a positive fixed displacement fuel pump driven by said prime mover, a fuel outlet therefrom, fuel flow responsive means therein, a first escape passage downstream from said fuel flow responsive means, a first escape valve therein, a manually controlled throttle downstream from said escape valve, a constant pressure difference valve located downstream from said throttle valve so as to maintain a specific flow for each position of said throttle valve, a second escape passage from the fuel outlet, a second valve therein, variable yieldable means controlled by the position of the throttle valve and adapted to oppose the flow responsive means, control means for the second escape valve responsive to the joint action of the yieldable means and the flow responsive means to hold the second escape valve closed until a specific speed of the prime mover is attained for each specific position of the throttle valve.

2. A device as set forth in claim 1 in which there is a third escape valve in said fuel outlet, barometric means responsive to the pressure of the atmosphere acting to open said third escape valve at high altitudes.

3. A device as set forth in claim 1 in which there is a third escape valve in said fuel outlet, barometric means responsive to the pressure of the atmosphere acting to open said third escape valve at high altitude and means responsive to the pressure in said escape passage tending to close said third escape valve.

GEORGE M. HOLLEY, Jr.

REFERENCES CITED

The following references are of record in the file of this patent:

UNITED STATES PATENTS

| Number | Name | Date |
| --- | --- | --- |
| 2,405,888 | Holley, Jr. | Apr. 13, 1946 |
| 2,407,115 | Udale | Sept. 3, 1946 |